US009204065B2

(12) United States Patent
Jarske et al.

(10) Patent No.: US 9,204,065 B2
(45) Date of Patent: Dec. 1, 2015

(54) REMOVING NOISE GENERATED FROM A NON-AUDIO COMPONENT

(71) Applicant: Nokia Corporation, Espoo (FI)

(72) Inventors: Petri Jarske, Tampere (FI); Miikka T. Vilermo, Siuro (FI); Juha R. Backman, Espoo (FI)

(73) Assignee: Nokia Corporation, Espoo (FI)

( * ) Notice: Subject to any disclaimer, the term of this patent is extended or adjusted under 35 U.S.C. 154(b) by 54 days.

(21) Appl. No.: 14/064,699

(22) Filed: Oct. 28, 2013

(65) Prior Publication Data

US 2015/0116519 A1 Apr. 30, 2015

(51) Int. Cl.
*H04N 5/225* (2006.01)
*H04N 5/357* (2011.01)
*H04N 5/232* (2006.01)
*H04B 15/00* (2006.01)
*H03B 29/00* (2006.01)

(52) U.S. Cl.
CPC ............. *H04N 5/357* (2013.01); *H04N 5/2252* (2013.01); *H04N 5/23212* (2013.01); *H04N 5/23287* (2013.01)

(58) Field of Classification Search
CPC .......... H04R 3/00; H04R 3/005; H04R 21/02; H04R 2430/20; G10L 21/0264; G10L 21/0224
USPC .................. 348/374, 375; 381/94.1, 95, 71.1, 381/71.11, 71.12, 122
See application file for complete search history.

(56) References Cited

U.S. PATENT DOCUMENTS

| | | | |
|---|---|---|---|
| 2004/0032509 A1* | 2/2004 | Owens et al. | 348/222.1 |
| 2005/0063553 A1* | 3/2005 | Ozawa | 381/92 |
| 2009/0103744 A1 | 4/2009 | Klinghult et al. | 381/71.1 |
| 2009/0214054 A1* | 8/2009 | Fujii et al. | 381/94.1 |
| 2010/0022283 A1 | 1/2010 | Terlizzi | 455/570 |
| 2010/0081487 A1 | 4/2010 | Chen et al. | 455/575.1 |
| 2011/0022403 A1 | 1/2011 | Washisu et al. | 704/503 |
| 2012/0154610 A1* | 6/2012 | Rahbar et al. | 348/207.99 |

(Continued)

FOREIGN PATENT DOCUMENTS

WO WO-2012/025783 A1 3/2012
WO WO-2012/090032 A1 7/2012

OTHER PUBLICATIONS

Asada, H. et al.; "Active Noise Cancellation Using MEMS Accelerometers for Motion-Tolerant Wearable Bio-Sensors"; Proceedings of the 26th Annual International Conference of the IEEE EMBS, San Francisco, CA, USA; Sep. 1-5, 2004; pp. 2157-2160.

(Continued)

*Primary Examiner* — Kelly L Jerabek
(74) *Attorney, Agent, or Firm* — Harrington & Smith

(57) ABSTRACT

An apparatus including at least one processor; and at least one non-transitory memory including computer program code, the at least one memory and the computer program code configured to, with the at least one processor, cause the apparatus to generate a signal from at least one sound transducer of an apparatus, where the signal is generated based upon sound received at the at least one sound transducer, where the sound includes acoustic noise generated by a component of the apparatus; and remove a noise component from the signal, where the noise component at least partially corresponds to the acoustic noise generated by the component.

20 Claims, 9 Drawing Sheets

(56) References Cited

U.S. PATENT DOCUMENTS

2012/0259628 A1    10/2012  Siotis ........................ 704/233
2014/0314241 A1*   10/2014  Penhune ..................... 381/71.1

OTHER PUBLICATIONS

Silva, J. et al.; "Coupled microphone-accelerometer sensor pair for dynamic noise reduction in MMG signal recording"; Electronics Letters, vol. 39, No. 21; Oct. 16, 2003; whole document (2 pages).

Cameron, D. et al.; "The Origin and Reduction of Acoustic Noise in Doubly Salient Variable-Reluctance Motors"; IEEE Transactions on Industry Applications, vol. 28, No. 6; Nov./Dec. 1992; pp. 1250-1255.

"Equivlent rectangular bandwidth"; Downloaded from the Internet on Sep. 9, 2013; whole document (3 pages); URL:en.wikipedia.org/wiki/Equivalent_rectangular_bandwith.

Simpson, M. et al.: "Full-Scale Demonstration Tests of Cabin Noise Reduction Using Active Vibration Control"; J. Aircraft, vol. 28, No. 3; 1991; pp. 208-215—abstract only.

* cited by examiner

REMOVING NOISE GENERATED FROM A NON-AUDIO COMPONENT

BACKGROUND

1. Technical Field

The exemplary and non-limiting embodiments relate generally to noise removal and, more particularly, to removing noise generated from an internal non-audio component in an apparatus from a signal.

2. Brief Description of Prior Developments

Non-audio components in mobile devices increasingly have features that cause noise. For example, a mobile device may have a camera which produces noise if features such as AutoFocus (AF) and Optical Image Stabilization (OIS) are used. Because mobile devices are small in size, the noise is easily picked up by the air microphone(s) of the mobile device. This may cause problems to video sound tracks for example.

Removing camera noise from audio tracks is a significant problem. Camera companies go as far as introducing new lens generations (e.g. CANON with STM lenses) for more silent operation, but with AF motors which are not as good as previous AF motors.

Removing camera noise from audio tracks can, to some extent, be done by measuring the noise signal caused by the camera to the air microphones and then subtracting the measured signal from the microphone signal when the camera is operational. Within the scope of mobile devices, current noise removal systems typically have a single constant model of the noise, and they apply noise removal when the system "guesses" camera noise to be present. However, variability of the noise over time, component wear, different calibration between microphones, devices and camera components, and changes in the noise when the device is held differently cause the noise to be difficult to estimate without real-time measurements. Thus, a static single constant model for noise reduction of noise generated from an internal non-audio component can be improved upon.

SUMMARY

The following summary is merely intended to be exemplary. The summary is not intended to limit the scope of the claims.

In accordance with one aspect, an example apparatus comprises at least one processor; and at least one non-transitory memory including computer program code, the at least one memory and the computer program code configured to, with the at least one processor, cause the apparatus to generate a signal from at least one sound transducer of an apparatus, where the signal is generated based upon sound received at the at least one sound transducer, where the sound includes acoustic noise generated by a component of the apparatus; and remove a noise component from the signal, where the noise component at least partially corresponds to the acoustic noise generated by the component.

In accordance with another aspect, an example method comprises generating a signal from at least one sound transducer of an apparatus, where the signal is generated based upon sound received at the at least one sound transducer, where the sound includes acoustic noise generated by a component of the apparatus; and remove a noise component from the signal, where the noise component at least partially corresponds to the acoustic noise generated by the component.

In accordance with another aspect, a non-transitory program storage device readable by a machine is provided, tangibly embodying a program of instructions executable by the machine for performing operations, the operations comprising generate a signal from at least one sound transducer of an apparatus, where the signal is generated based upon sound received at the at least one sound transducer, where the sound includes acoustic noise generated by a component of the apparatus; and remove a noise component from the signal, where the noise component at least partially corresponds to the acoustic noise generated by the component.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
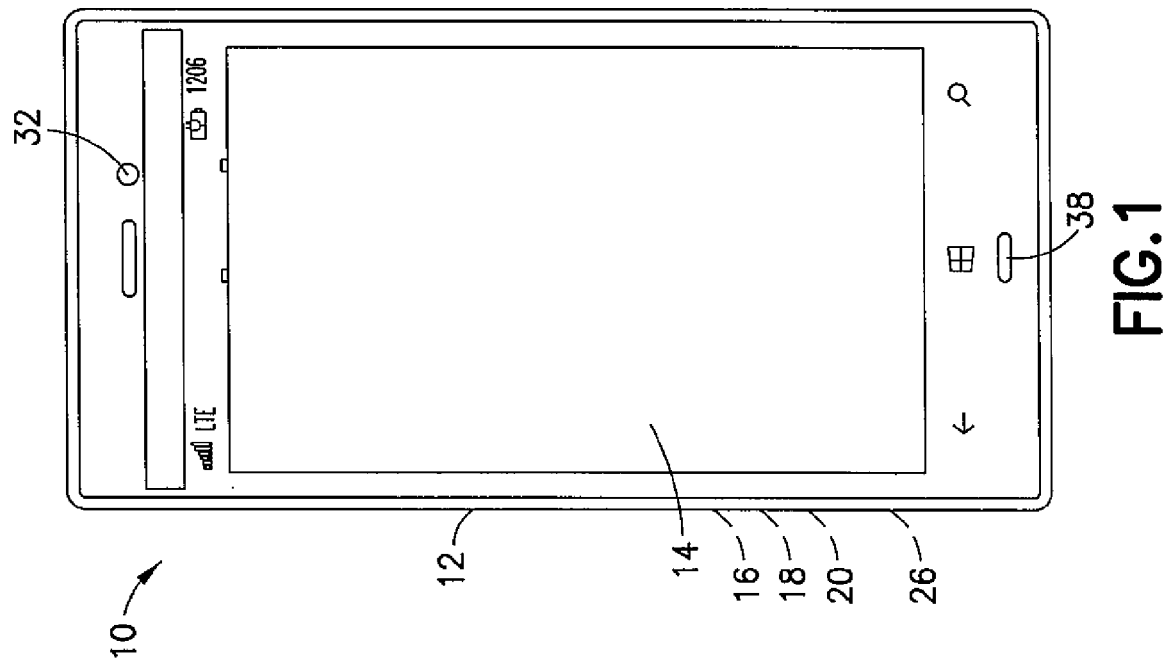
FIG. 1 is a front view of an example embodiment of an apparatus comprising features as described herein.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone. For example, the apparatus might be a SLR type of camera or video recorder for example.

Figure 2:
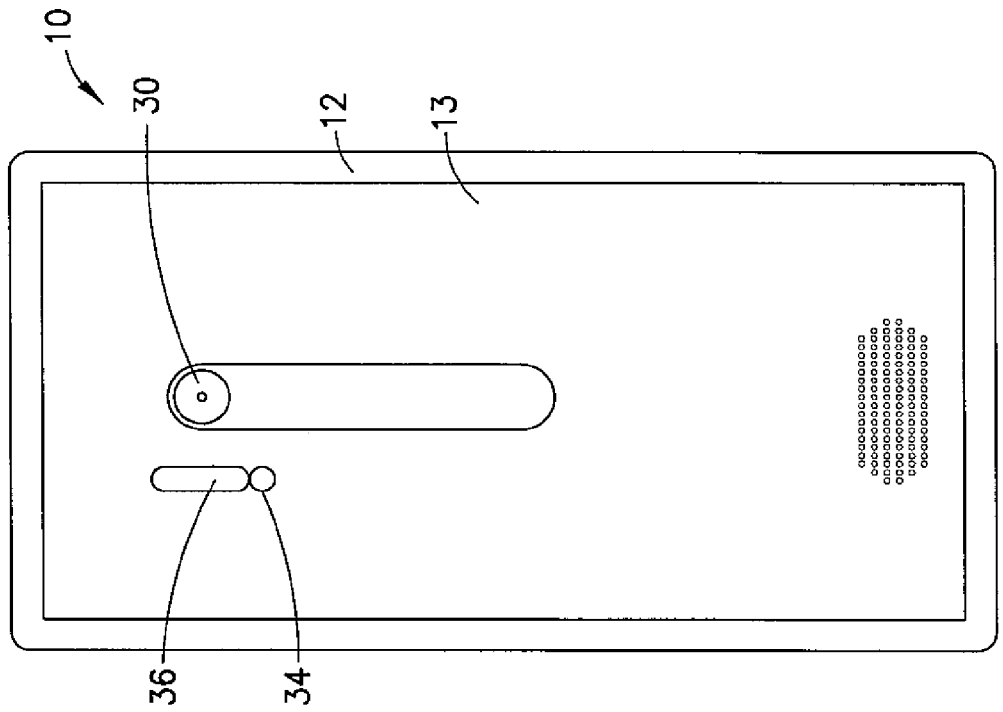
FIG. 2 is a rear view of the apparatus shown in FIG. 1.
Figure 3:
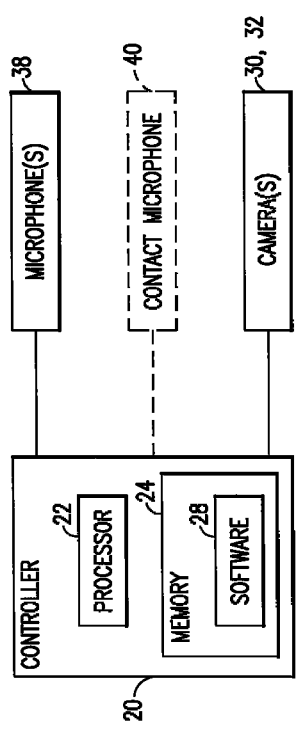
FIG. 3 is a diagram illustrating some of the components of the apparatus shown in FIGS. 1-2.

Referring also to FIGS. 2-3, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The receiver and the transmitter may be provided in the form of a transceiver for example. The controller 20 may include at least one processor 22, at least one memory 24, and software 28. The electronic circuitry inside the housing 12 may comprise at least one printed wiring board (PWB) having components such as the controller 20 thereon. The receiver 16 and transmitter 18 form a primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. The LED 34 and the flash system 36 are also visible at the rear side of the apparatus, and are provided for the camera 30. The cameras 30, 32, the LED and the flash system 36 are connected to the controller 20 such that the controller 20 may control their operation. In an alternate example embodiment the rear side may comprise more than one camera, and/or the front side could comprise more than one camera. The apparatus 10 includes a sound transducer provided as an air microphone 38. In an alternate example the apparatus may comprise more than one air microphone.

As shown in FIG. 3, the apparatus 10 may comprise one or more contact microphones 40. A contact microphone, otherwise known as a pickup or a piezo, is a form of microphone designed to sense audio vibrations through solid objects. Unlike normal air microphones, contact microphones are almost completely insensitive to air vibrations, and transduce substantially only structure-borne sound. One type of contact microphone is an accelerometer contact microphone.

In the example embodiment shown, the contact microphone 40 is an accelerometer used to measure the noise generated from an internal non-audio component of the apparatus 10. Alternatively, or in addition to the internal non-audio component, the contact microphone 40 may be used to sense or monitor vibrations from one or more components of the apparatus which are at least partially internal and may be at least partially at an exterior surface. The vibration sensor may include multiple measurement devices including the contact microphone 40. Although this example is being described with regard to sensing vibrations from a non-audio component, features may be used to sense a component such as a display panel speaker or tactile audio display, such as described in International Application Nos. PCT/IB2010/053783 and PCT/IB2010/056150 which are hereby incorporated by reference in its entireties. In the embodiment shown the accelerometer 40 is used to measure noise generated by the camera 30. With help of a measured or modeled difference between the noise picked up by the microphone 38 and the accelerometer 40, noise from the operation of the camera 30 may be removed from the signal from the microphone 38.

As noted above, a non-audio component such as a camera in a mobile device may produce noise if features, such as AutoFocus (AF) and Optical Image Stabilization (OIS) for example, are used. Because mobile devices are small in size, such as a smartphone for example, the noise is easily picked up by the air microphone(s) of the mobile device. This may cause problems to video sound tracks for example.

With features as described herein, a filter may be tuned in a quiet environment, and then the filter may be used to convert the detected accelerometer signal into an approximation of the noise picked up by an air microphone. The approximation of the noise may then be subtracted from the air microphone signal. In this way calculation of correlations during capture is not needed. Because calculation of correlations during capture is not needed, this saves processing power. With features as described herein, a detected and sampled noise may be subtracted after filtering from the microphone signals. The filter may be tuned in a quiet environment, and then the filter may be used to convert the detected accelerometer signal into an approximation of the noise picked up by the acoustic air microphone 38. In this way the apparatus and method does not need to calculate correlations during capture.

Typically, in mobile devices, the camera noise travels first as a structural sound along the device body and then jumps to the acoustic air microphone over air. The jump over the air is usually very short. Because the jump over the air is usually very short, the sound can be estimated.

The accelerometer 40 (or contact microphone) only picks up structural sounds. Therefore, the accelerometer 40 is not disturbed by sound sources around the device such as a regular acoustic air microphone would be. Also, no extra hardware is needed because mobile devices typically already have an accelerometer. In other words, the accelerometer used for one or more other functions of the mobile device may also be used for the noise removal, as described herein, without the need to add an additional accelerometer to the mobile device 10.

Figure 4:
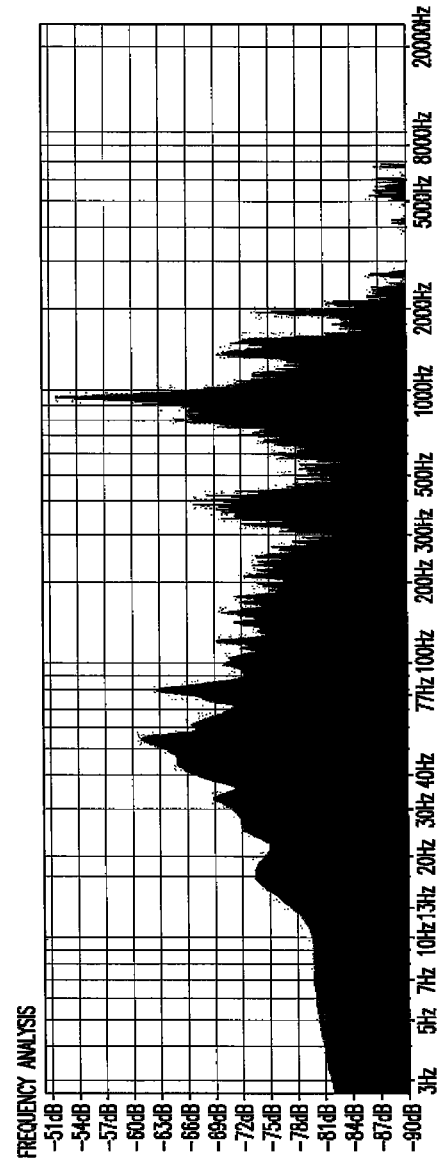
FIG. 4 is a diagram illustrating sound received at the air microphone of the apparatus shown in FIG. 1 corresponding to sound generated by an operation of the camera of the apparatus shown in FIG. 1.
Figure 5:
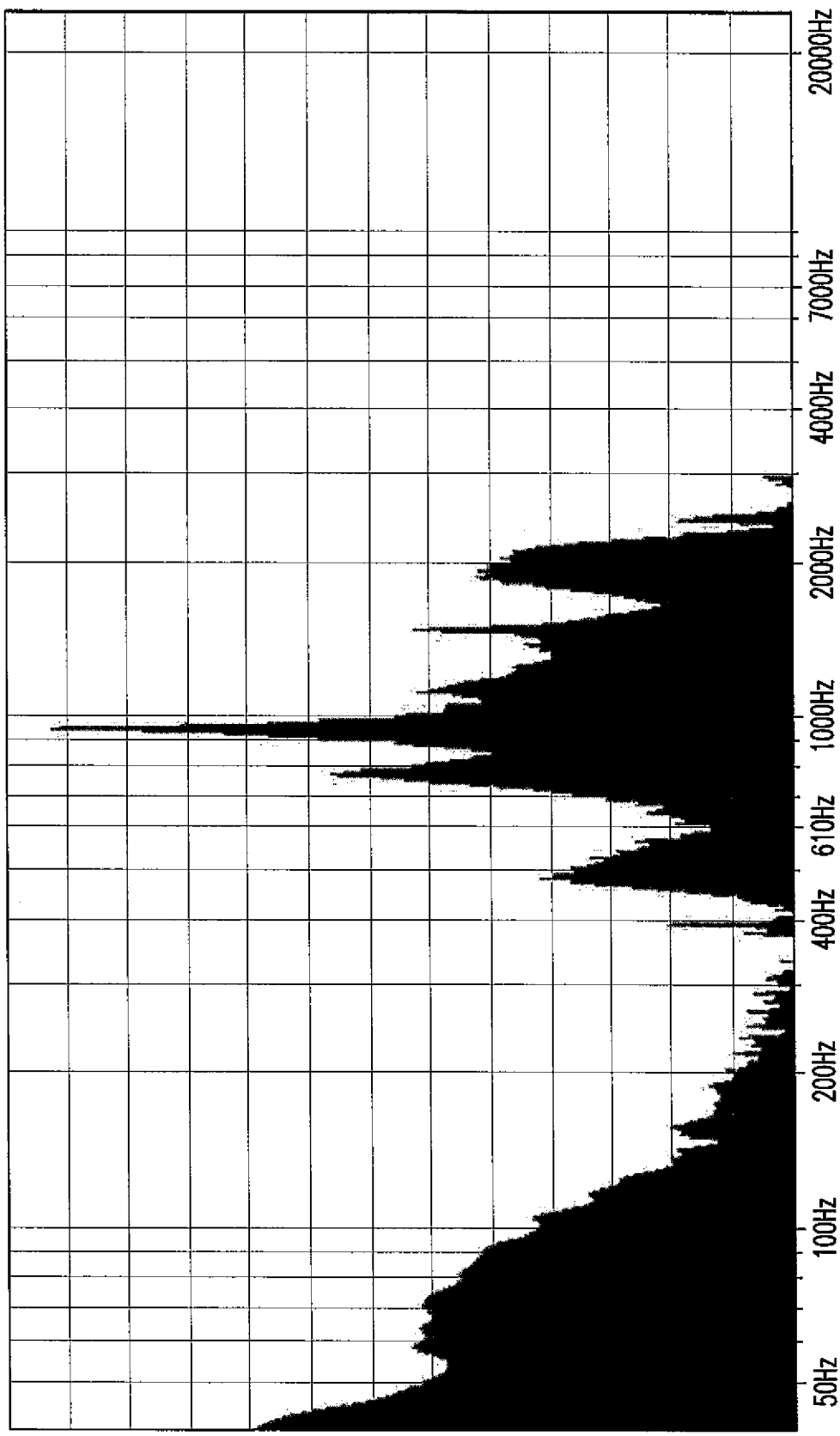
FIG. 5 is a diagram illustrating contact vibrations received at the contact microphone of the apparatus shown in FIG. 1 corresponding to vibrations generated by the operation of the camera of the apparatus shown in FIG. 1 as in FIG. 4.

The noise removal system may obtain an estimate of the difference between the camera noises picked up by the microphone 38 and the accelerometer 40 by operating the camera 30 when the mobile device 10 is in a silent location. An example of a measurement of noise from an operation of the camera 30, as picked up by the microphone 38 in a silent environment, is shown in FIG. 4. An example of a measurement of vibrations picked up by the accelerometer 40 in the silent environment for the same operation of the camera 30 is shown in FIG. 5. As can be seen in comparing FIG. 5 to FIG. 4, the noise picked up by the microphone 38 and the vibrations picked up by the accelerometer 40 are very close; particularly in the loudest and most disturbing 1 kHz region. Therefore, the signal from the accelerometer 40 may be used as a good estimate for the noise from the camera 30 picked up by the microphone 38.

The signal m(t) picked up by the microphone 38 and the signal a(t) picked up by the accelerometer 40 may be divided into short time segments, typically for example 50 ms or 2048 samples: $m_k(t)$, $a_k(t)$ $$m_k(t) = m\left(\frac{kW + w}{F_s}\right), w = 1, \ldots, W$$

where W is the segment length in samples (2048), w is an index of the samples inside a segment and $F_s$ is the sampling rate; typically 48 kHz for example. Typically, the segments may overlap (by 50% for example) and are windowed. However, for the sake of simplicity, the formulas here are presented non-overlapping and non-windowed. The segments may be transformed into frequency domain, typically with fast Fourier transform (FFT). After transformation we get $M_k(f)$ and $A_k(f)$. The frequency domain signals may be divided into sub-bands, typically using ERBs (equivalent rectangular bands), thus we get $M_k(b,i)$ and $A_k(b,i)$ where b corresponds to the band index and i to the index of the frequency bins inside the band. Assuming we have K segments, the average level ratio between the microphone and accelerometer signals for each band is:

$$c_b = \frac{\sum_{k=1}^{K} \sum_{i=1}^{I_b} \|M_k(b,i)\|}{\sum_{k=1}^{K} \sum_{i=1}^{I_b} \|A_k(b,i)\|}$$

where $I_b$ is the number of frequency bins in band b.

The delay between the camera noise picked up by the accelerometer and the microphone can be estimated in silent surroundings using the following:

$$\tau_{max} = \mathrm{argmax}_\tau \sum_t m(t)a(t-\tau)$$

where $a_k(t-\tau)$ is the kith segment of the accelerometer signal delayed by $\tau$:

$$a_k(t-\tau) = a\left(\frac{kW+w}{F_s}-\tau\right), w=1, \ldots, W$$

We further define that $A_{k,T}(b,i)$ is the b:th band in frequency domain of FFT($a_k(t-\tau)$).

With the above notations we get the final noise removed microphone signal in frequency domain for band b:

$$\hat{M}_k(b,i) = M_k(b,i) - A_{k,\tau}(b,i)c_b$$

After camera noise has been removed from all frequency bands with the above formula, the noise free signal may be inverse transformed to time domain.

Figure 7:
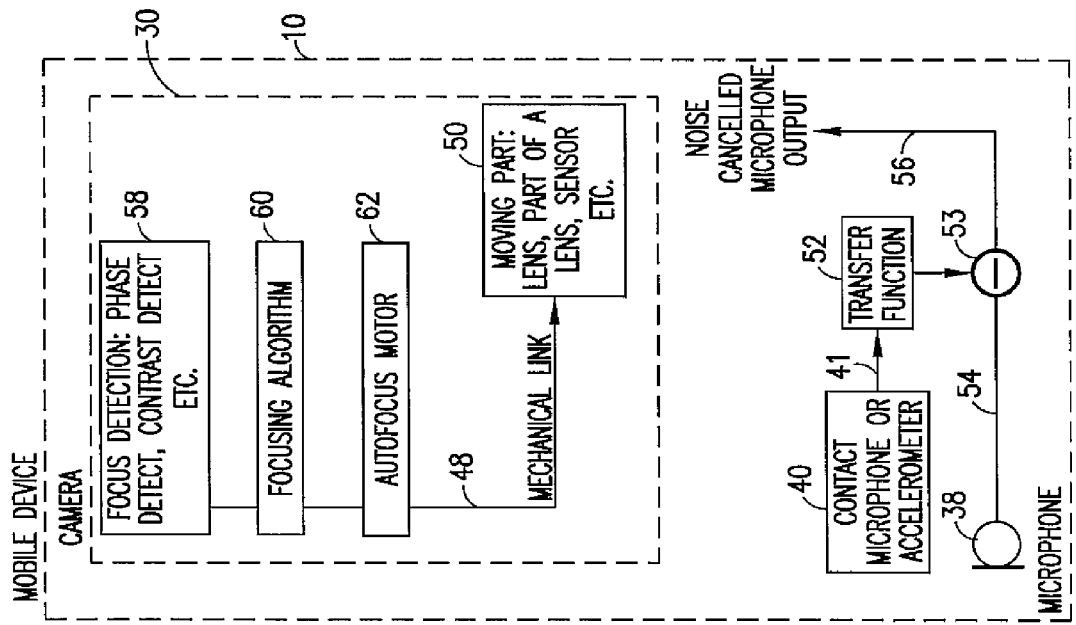
FIGS. 6-8 are diagrams illustrating example uses of contact microphone for removing noise from the air microphone signal.
Figure 6:
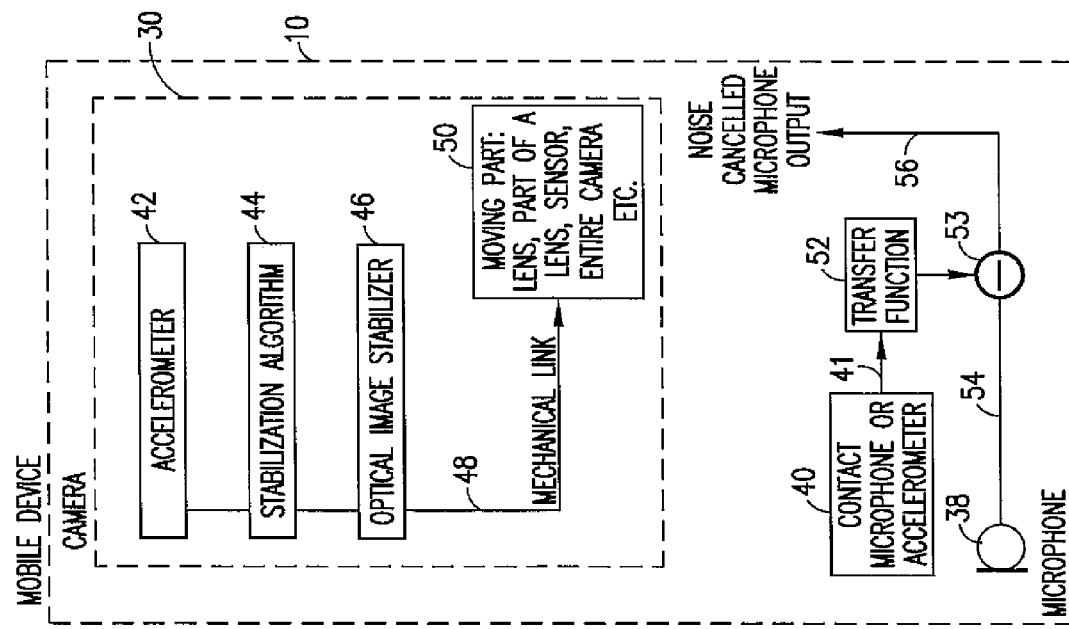
Figure 8:
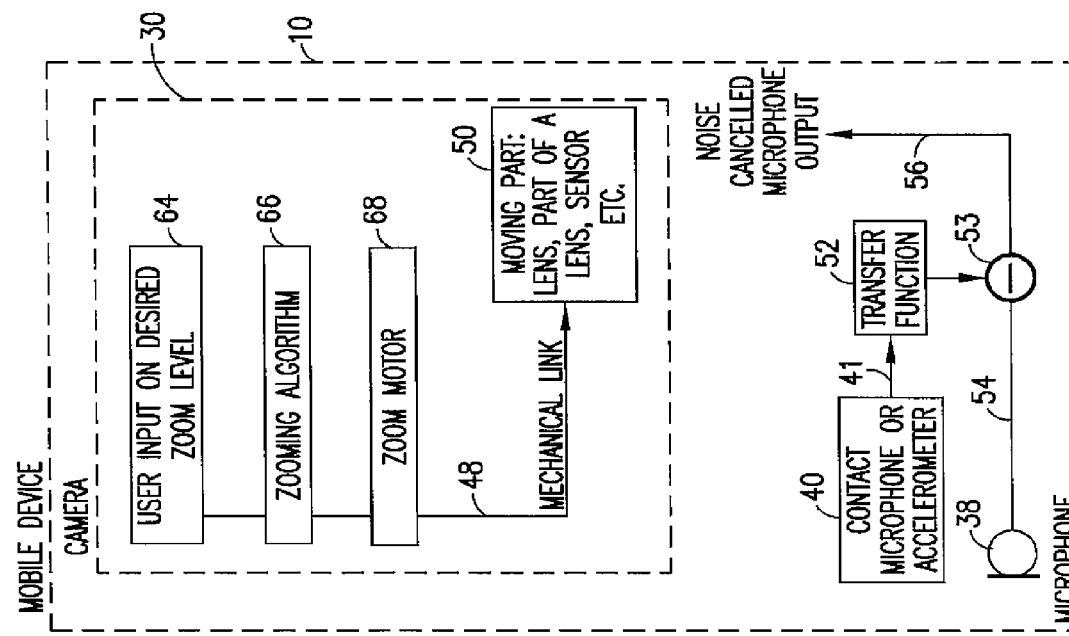

Referring also to FIGS. 6-8, examples of use of features as described herein are illustrated with respect to example operations of the camera 30. In particular, FIG. 6 is in regard to Optical Image Stabilization (OIS) operation by the camera 30, FIG. 7 is in regard to AutoFocus (AF) operation by the camera 30, and FIG. 8 is in regard to Zoom operation by the camera 30. As can be seen in FIG. 6, the OIS operation uses an accelerometer 42, a stabilization algorithm 44 and an optical image stabilizer 46 with a mechanical link 48 to the moving parts 50 of the camera 30 (such as the lens, part of the lens, sensor, entire camera, etc.). Noise from the camera 30 generated by the OIS operation may be picked up by the contact microphone 40 to produce an output signal 41, and with use of a transfer function 52, a subtraction 53 may be made to the signal 54 from the microphone 38 to produce the resultant noise cancelled microphone signal 56.

As can be seen in FIG. 7, the AutoFocus (AF) operation uses a focus detection 58, a focusing algorithm 60 and an Autofocus motor 62 with a mechanical link 48 to the moving parts 50 of the camera 30 (such as the lens, part of the lens, sensor, entire camera, etc.). Noise from the camera 30 generated by the AF operation may be picked up by the contact microphone 40 to produce an output signal 41, and with use of a transfer function 52, a subtraction 53 may be made to the signal 54 from the microphone 38 to produce the resultant noise cancelled microphone signal 56.

As can be seen in FIG. 8, the Zoom operation uses a zoom input 64, a zooming algorithm 66 and a zoom motor 68 with a mechanical link 48 to the moving parts 50 of the camera 30 (such as the lens, part of the lens, sensor, entire camera, etc.). Noise from the camera 30 generated by the zoom operation may be picked up by the contact microphone 40 to produce an output signal 41, and with use of a transfer function 52, a subtraction 53 may be made to the signal 54 from the microphone 38 to produce the resultant noise cancelled microphone signal 56. Of course, the contact microphone 40 may pick up vibrations for all three operations (OIS, AF and Zoom) at a same time.

With features as described above, no extra hardware is needed versus a convention mobile device, the accelerometer is not disturbed by external sound sources, and a very good estimate of the camera noise picked up by the microphone 38 is provided. The accelerometer 40 may also provide a signal to remove "handling" noise in addition to noise generated from operation of non-audio internal component(s).

Figure 9:
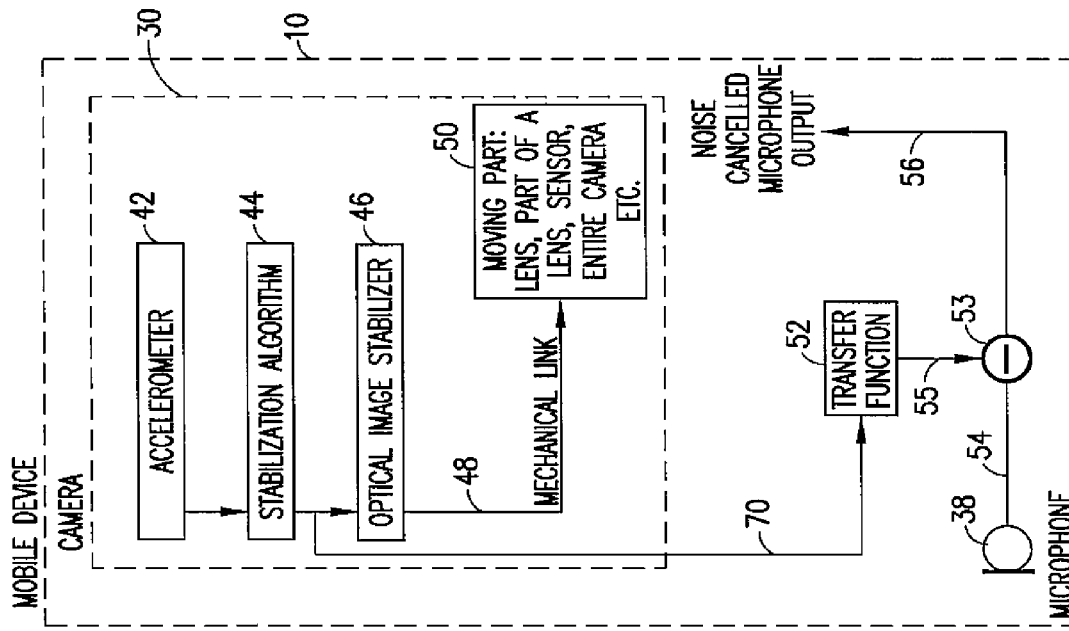
FIGS. 9-11 are diagrams similar to FIGS. 6-8 illustrating example uses of camera drive signals for removing noise from the air microphone signal.
Figure 11:
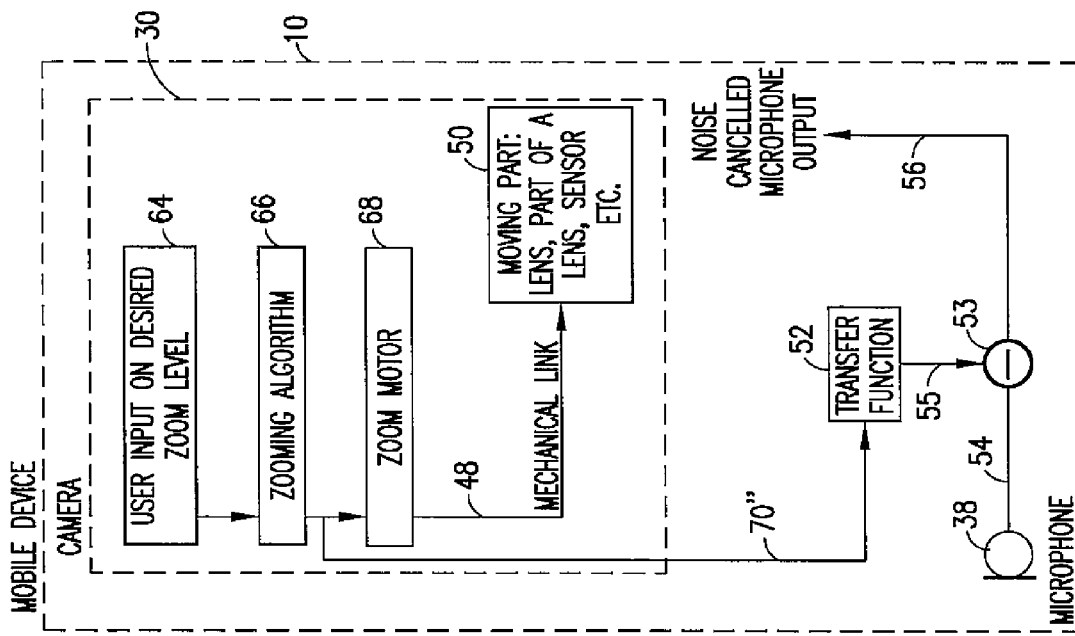
Figure 10:
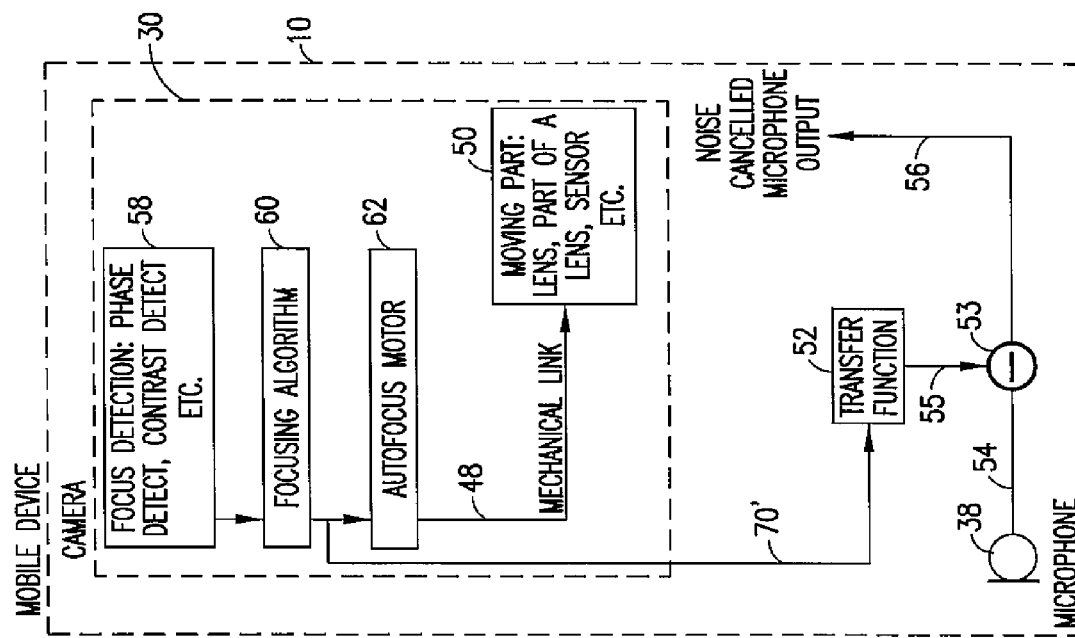

Referring also to FIG. 9, as an alternative to use of the contact microphone 40, or perhaps in addition to use of the contact microphone 40, the drive signal 70 that drives the noise source (i.e. a drive signal which at least partially drives the camera 30) may be routed to the noise removal processing. In the noise removal processing the drive signal may be processed with a model of the transfer function 52 from the driving signal to the noise in the signal 54 from the microphone 38. The processed signal 55 is subtracted from the microphone signal 54 to produce noise cancelled signal 56. In FIG. 9 the drive signal 70 is from the stabilization algorithm 44 of the OIS operation. In FIG. 10 the drive signal 70' is from the focusing algorithm 60 of the AF operation. In FIG. 11 the drive signal 70" is from the zooming algorithm 66 of the Zoom operation.

Thus, FIGS. 9-11 illustrate that the input signal picked up by an accelerometer or a contact microphone may be replaced (or supplemented) by the driver signal of the noise source. If the input signal picked up by an accelerometer or a contact microphone is replaced by the driver signal of the noise source, this has a benefit that the presence of the noise source is known exactly, and that external noise sources (such as handling noise for example) do not disrupt the noise removal algorithm.

Figure 12:
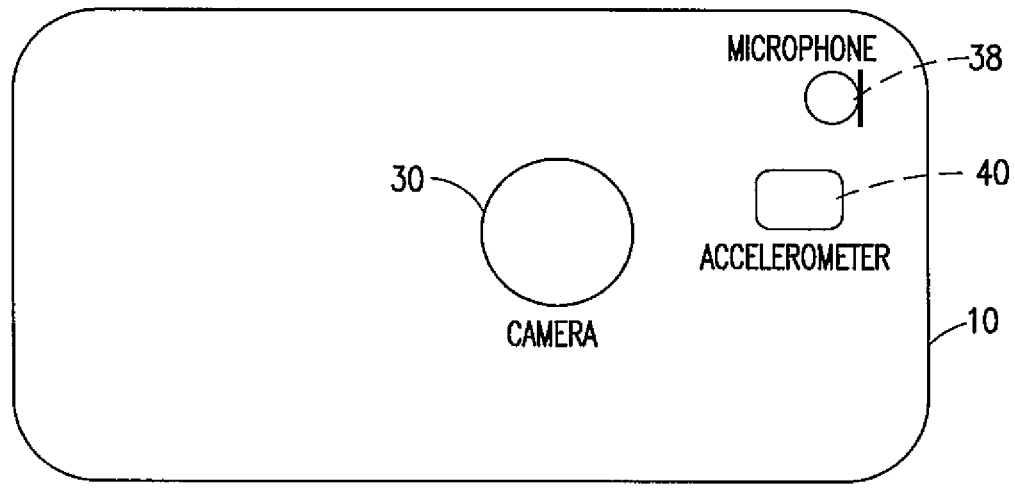
FIGS. 12 and 13 are diagram illustration examples of locations of components of the apparatus of FIG. 1 relative to one another.
Figure 13:
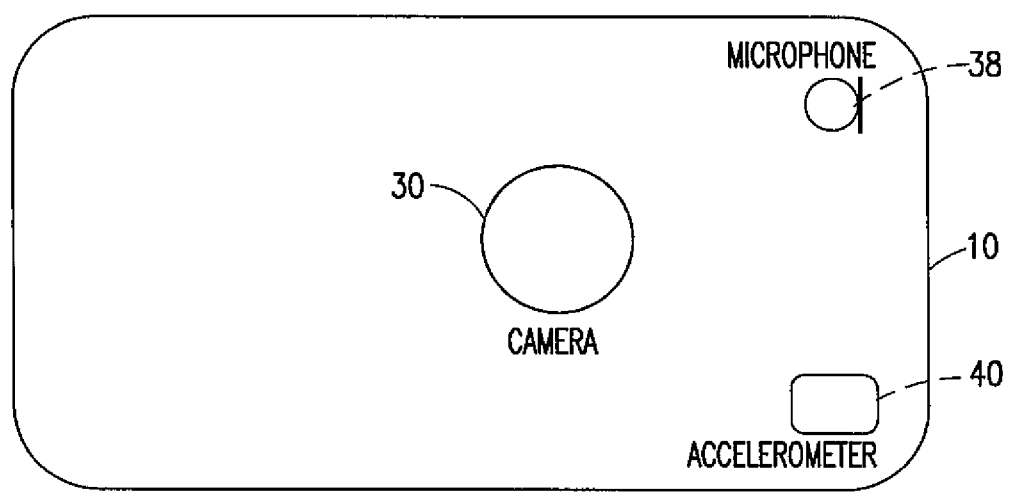

Referring also to FIGS. 12-13, examples of possible locations of the acoustic microphone, noise source and contact microphone are shown. In order to get as good an estimate of the camera noise as possible, the accelerometer may be placed to a location where the noise caused by the camera is as close to the camera noise picked up by the microphone as possible. This may be achieved by placing the accelerometer as close to the microphone as possible (see FIG. 12) or to a place that is symmetrical with respect to the device and the microphone location (see FIG. 13). A good location can be found by testing several locations. A good way to measure the "goodness" of a location is to measure the difference between the camera noise picked up by the microphone and the linearly modified noise picked up by the accelerometer, $M_k(b,i)$ and $A_{k,T}(b,i)$ as defined above respectively. The location that minimizes the difference is a good location.

In the example embodiment of FIG. 12, the accelerometer (contact microphone) 40 is placed on the mobile device 10 at a location where the noise it picks up from the camera 30 is very close to the camera noise picked up by the acoustic microphone 38. The location of the contact microphone 40 is relatively close to the acoustic microphone 38. With this type of relative locationing of components, there will be better noise removal because there should be more accurate output from the contact microphone versus the noise received by the acoustic microphone. If there is more than one acoustic microphone 38, the accelerometer may be placed close to the microphone that suffers the most from the camera noise. In the example embodiment of FIG. 13, the location of the acoustic microphone 38 and the contact microphone 40 are symmetrically positioned relative to the noise source (the camera 30). With this type of relative locationing of components, there will be better noise removal because there should be more accurate output from the contact microphone versus the noise received by the acoustic microphone. Thus, with features as described herein, the vibration detector 40 may be placed symmetrically to the microphone 38.

With features as described with respect to FIGS. 12 and 13 above, an improved estimate of the camera noise picked up by the microphone 38 may be provided. Also, with symmetrical placement the accelerometer positioning has some degree of freedom for design purposes.

If the device has more than one acoustic microphone 38, the presence of camera noise may be detected by summing the microphone signals, together with the delays, that maximize the noise in the summed signal. The maximized noise may then be easier to identify for removal. Sometimes in noisy environments it is difficult to estimate when internal component noise, such as noise from the camera 30, is present. This estimate may be improved if the device is provided with several acoustic air microphones rather than one acoustic air microphone.

In a quiet environment the delays between the camera noise reaching the different microphone signals may be found as described below. Let's assume that the device has three (3) microphones (this algorithm benefits devices with two or more microphones). Let the microphone signals be $m_1(t)$, $m_2(t)$, and $m_3(t)$. The delays causing maximum correlation between microphones 1 and 2, and, 1 and 3 are respectively:

$$\tau_{1,2} = \operatorname*{argmax}_\tau \sum_t m_1(t) m_2(t-\tau)$$

$$\tau_{1,3} = \operatorname*{argmax}_\tau \sum_t m_1(t) m_3(t-\tau)$$

We create a sum signal that maximizes the presence of camera noise:

$$m = m_1(t) + m_2(t-\tau_{1,2}) + m_3(t-\tau_{1,3})$$

Running the camera noise detection algorithms on the sum signal produces a more reliable estimate than running a noise detection algorithm on individual microphone signals. With this feature there is an improved estimate of the presence of camera noise.

Figure 14:
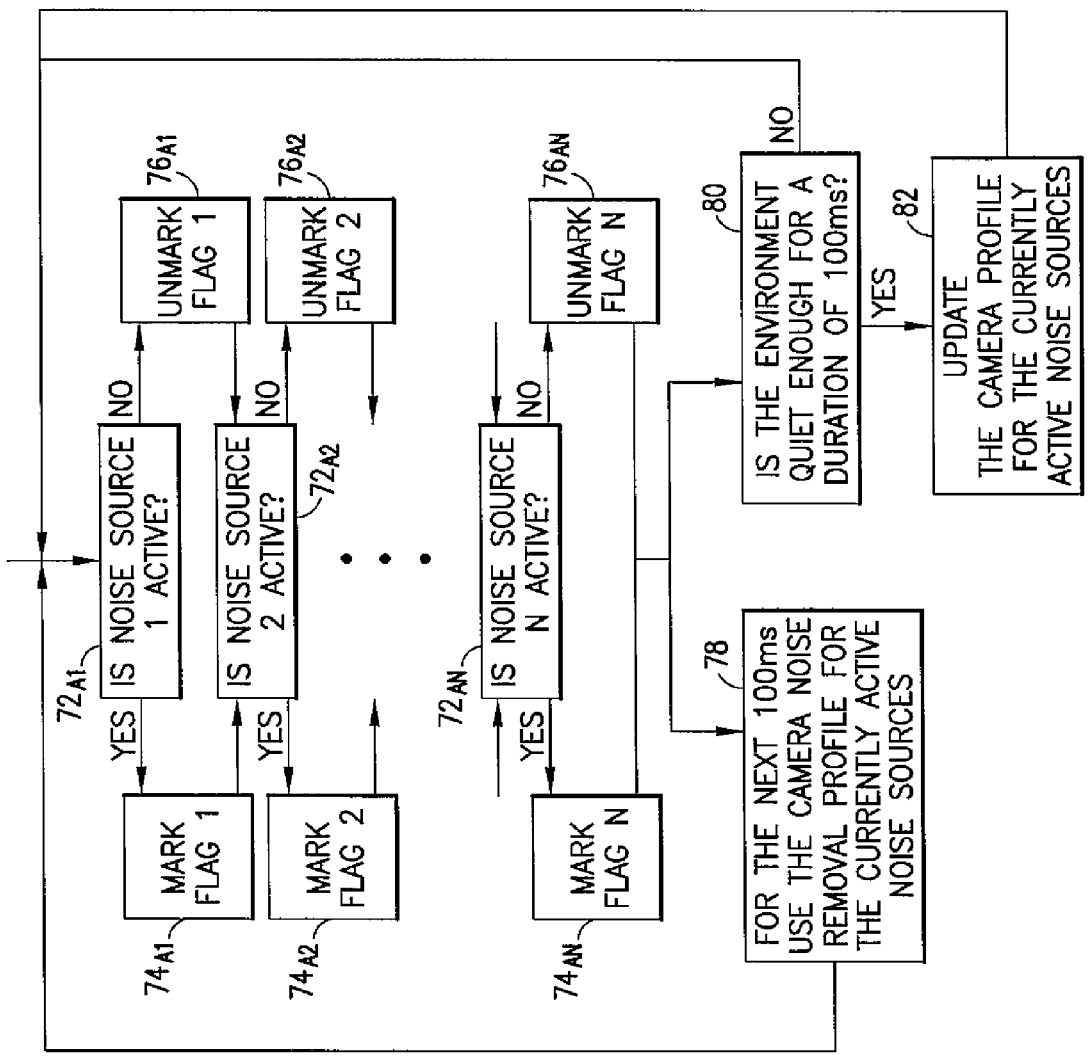
FIG. 14 is a diagram illustrating an example method.

FIG. 14 illustrates another method which may be used as an alternative, or in addition, to the features described above. If there are several noise sources present, such as both OIS and AF or multiple cameras for example, the presence of each noise source may be signaled to the noise removal algorithm which may then use a different model for removing noise in the presence of all possible combinations of the noise sources. Since the noise may change over long periods of time, the noise removal algorithm may be configured to update the noise model for each combination when the combination is signaled being used and the device surroundings are otherwise quiet. FIG. 14 relates merely to camera noise sources. However, features as described herein may be used with any other internal non-audio component noise source.

As noted in FIG. 14, the method may comprise determining if a noise source is active as indicated by blocks $72_{A1}$-$72_{AN}$. If the noise source is active, this may provide a Mark flag $74_{A1}$-$74_{AN}$. If the noise source is not active, this may provide a Unmark flag $76_{A1}$-$76_{A}$. The flags may then be used, as indicated by block 78, with a camera noise removal profile for currently active noise sources, such as for a predetermined time period of 100 ms for example. In addition, in this example, the apparatus 10 may determine if the environment is quiet enough for a period of time, as indicated by block 80, such as 100 ms for example, to allow updating to occur. If it is quiet enough for a sufficient long amount of time, then the apparatus may be configured to update the camera profile for the currently active noise sources as indicated by block 82.

With features as described herein, the noise may have a fixed delay from the camera to each of the fixed contact microphone(s) and the apparatus and method may try to maximize the camera noise in the summed signal in order to improve its detection.

The camera noise (or noise from another internal noise source) may come from more than one source. Each of these noise sources may be picked up differently by the microphone(s) in the device. Also, the noise sources may interact when they are active at a same time. Examples of the noise sources may be camera AF, camera OIS, multiple cameras, etc. The camera system may pass information to the noise removal algorithm about which of the noise sources are active. The noise removal algorithm may have a different profile of the noise for each possible combination of the noise sources for each microphone. For example, in a device which has two cameras (camera 1 and camera 2), where both of the cameras have AF and OIS capabilities, and where there are two acoustic microphones, there may be thirty profiles stored in the memory 24 of the apparatus 10 for the following thirty conditions/situations of use:

camera 1 AF for mic 1
camera 1 AF for mic 2
camera 1 OIS for mic 1
camera 1 OIS for mic 2
camera 2 AF for mic 1
camera 2 AF for mic 2
camera 2 OIS for mic 1
camera 2 OIS for mic 2
camera 1 AF+camera 1 OIS for mic 1
camera 1 AF+camera 1 OIS for mic 2
camera 2 AF+camera 2 OIS for mic 1
camera 2 AF+camera 2 OIS for mic 2
camera 1 AF+camera 2 AF for mic 1
camera 1 AF+camera 2 AF for mic 2
camera 1 OIS+camera 2 OIS for mic 1
camera 1 OIS+camera 2 OIS for mic 2
camera 1 AF+camera 2 OIS for mic 1
camera 1 AF+camera 2 OIS for mic 2
camera 2 AF+camera 1 OIS for mic 1
camera 2 AF+camera 1 OIS for mic 2
camera 1 AF+camera 1 OIS+camera 2 AF for mic 1
camera 1 AF+camera 1 OIS+camera 2 AF for mic 2
camera 1 AF+camera 1 OIS+camera 2 OIS for mic 1
camera 1 AF+camera 1 OIS+camera 2 OIS for mic 2
camera 1 AF+camera 2 AF+camera 2 OIS for mic 1
camera 1 AF+camera 2 AF+camera 2 OIS for mic 2
camera 1 OIS+camera 2 AF+camera 2 OIS for mic 1
camera 1 OIS+camera 2 AF+camera 2 OIS for mic 2
camera 1 AF+camera 1 OIS+camera 2 AF+camera 2 OIS for mic 1
camera 1 AF+camera 1 OIS+camera 2 AF+camera 2 OIS for mic 2

The apparatus 10 may come with pre-installed profiles. The device may also update the profiles when the surrounding sounds are so quiet, that it can be safely assumed that most of the sound picked up by the microphones comes from the camera noises. It is also possible to reduce the number of profiles by assuming that when different noise sources are present together, the resulting noise is simply the sum of the individual noise sources. In that case only the noise profiles for individual noise sources are needed. For example:

camera 1 AF for mic 1
camera 1 AF for mic 2
camera 1 OIS for mic 1
camera 1 OIS for mic 2
camera 2 AF for mic 1
camera 2 AF for mic 2
camera 2 OIS for mic 1
camera 2 OIS for mic 2

In an example embodiment, these might be updated only when the environment is quiet and only the individual noise component is active and other noise components are not active. The sum of the component noises may be used as an estimate when several noise sources are present. This type of example embodiment allows for a continuously learning noise removal algorithm which may work well for a long time even after the movable camera components start to wear with age (changing their acoustic noise output).

Testing of features as described herein was done using a separate acceleration sensor and laboratory amplifier, which has previously been used for analyzing noises inside product mechanics. One would expect the improvement to be similar to audio interference cancellation methods implemented with multiple microphones. Even there, the interference reduction heavily depends on how well the reference sensor, in this case an accelerometer, captures the noise and avoids capturing the wanted signal. In order to be audible, the reduction may be about 6 dB or more. The best one might expect is probably around 20-30 dB, which is achievable by traditional multi-microphone noise cancelling systems. The accelerometer may be less sensitive to positioning than a microphone. The accelerometer is in physical contact with the vibrating body, whereas an acoustic microphone uses air between the body and the sensor. Since the same acceleration sensor has previously been used analyzing other noise sources inside product mechanics may undoubtedly reduce other noises as well, such as noises generated by power management circuitry, or logic clock circuitry, which often result in vibrations such as in capacitors for example.

In one example embodiment, an apparatus comprises at least one processor; and at least one non-transitory memory including computer program code, the at least one memory and the computer program code configured to, with the at least one processor, cause the apparatus to generate a signal from at least one sound transducer of an apparatus, where the signal is generated based upon sound received at the at least one sound transducer, where the sound includes acoustic noise generated by a component of the apparatus; and remove a noise component from the signal, where the noise component at least partially corresponds to the acoustic noise generated by the component.

The component may be a non-audio component such as a camera. The noise component may correspond to acoustic noise generated by the camera from at least one of Auto Focus (AF) and Optical Image Stabilization (OIS). The apparatus may further comprise at least one sensor comprising an accelerometer contact microphone configured to sense movement of the non-audio component which generates the acoustic noise. The apparatus may be configured to reduce the noise component based upon subtracting a signal of the accelerometer contact microphone from the signal of the at least one sound transducer. The accelerometer contact microphone may be suitably located on the apparatus relative to the component at least one of in very close proximity to one another; or substantially equal in distance relative to one another versus a distance between the sound transducer and the component. As used here, "located on" includes "in" or "inside"; partially or wholly. The apparatus may be configured to use a drive signal which drives the component to generate the noise component. The at least one sound transducer may comprise two or more sound transducers, where the apparatus is configured to sum signals from the sound transducers together with delays that maximize the acoustic noise generated by the component. The apparatus may be configured to select a noise removal algorithm model, for removing the acoustic noise generated by the non-acoustic component, based upon at least one signal which indicates use of one or more operations of the component.

Figure 15:
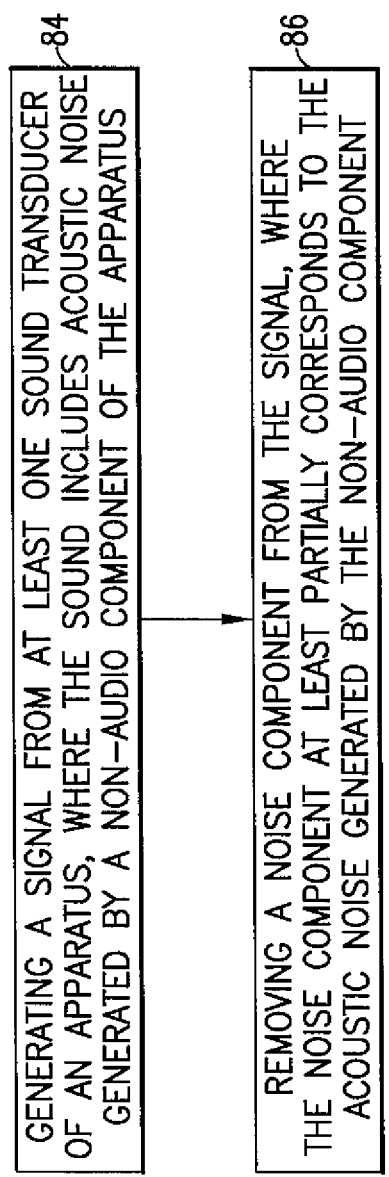
FIG. 15 is a diagram illustrating an example method.

Referring also to FIG. 15, an example method may comprise generating a signal from at least one sound transducer of an apparatus, as indicated by block 84, where the signal is generated based upon sound received at the at least one sound transducer, where the sound includes acoustic noise generated by a component of the apparatus; and removing a noise component from the signal, as indicated by block 86, where the noise component at least partially corresponds to the acoustic noise generated by the component. The component may be a camera with the acoustic noise coming from at least one operation of the camera. The noise component may correspond to acoustic noise generated by the camera from at least one of Auto Focus (AF) and Optical Image Stabilization (OIS). The method may further comprise an accelerometer contact microphone sensing movement of the component to create the noise component to be removed from the signal. The method may comprise the apparatus reducing the noise component based upon subtracting a signal of the accelerometer contact microphone from the signal of the at least one sound transducer. The accelerometer contact microphone may be located on the apparatus relative to the component with the acoustic sound from the component reaching the at least one sound transducer at about a same time as the accelerometer contact microphone receives mechanical movement based upon movement of the component. The method may further comprise using a drive signal which drives the component to generate the noise component. The at least one sound transducer may comprise two or more sound transducers, where the method comprises summing signals from the sound transducers together with delays that maximize the acoustic noise generated by the component. The method may further comprise selecting a noise removal algorithm model, for removing the acoustic noise generated by the non-acoustic component, based upon at least one signal which indicates use of one or more operations of the component.

An example embodiment may comprise a non-transitory program storage device readable by a machine, tangibly embodying a program of instructions executable by the machine for performing operations, the operations comprising generating a signal from at least one sound transducer of an apparatus, where the signal is generated based upon sound received at the at least one sound transducer, where the sound includes acoustic noise generated by a component of the apparatus; and removing a noise component from the signal, where the noise component at least partially corresponds to the acoustic noise generated by the component.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The apparatus may comprise means for performing any of the methods described above, such as at least one processor and at least one memory comprising software. The means may comprise any suitable components in the apparatus 10 for accomplishing the means. The method may comprise means for performing any of the method steps described above.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   a camera that is at least partially internal in the apparatus;
   a contact microphone configured to sense object vibrations;
   an air microphone for generating a signal from sound received at the air microphone, the sound including acoustic noise generated by the camera;
   at least one processor; and
   at least one non-transitory memory including computer program code,
   the at least one memory and the computer program code configured to, with the at least one processor, cause the apparatus to:
   utilize the sensed object vibrations to determine a noise component of the signal that at least partially corresponds to the acoustic noise generated by the camera and to remove the noise component from the signal.

2. An apparatus as in claim 1 where the acoustic noise is generated from camera operations comprising at least one of Auto Focus (AF) and Optical Image Stabilization (OIS).

3. An apparatus as in claim 1 wherein the contact microphone comprises an accelerometer.

4. An apparatus as in claim 3 where the apparatus is configured to remove the noise component by subtracting at least one output of the accelerometer from the signal generated by the air microphone.

5. An apparatus as in claim 3 where the accelerometer is located on the apparatus relative to the camera substantially equal in distance relative to one another versus a distance between the air microphone and the camera.

6. An apparatus as in claim 1 where the noise component of the signal is further determined from a drive signal which drives the camera.

7. An apparatus as in claim 1 where the air microphone comprises two or more air microphones, where the apparatus is configured to sum signals from the air microphones together with delays that maximize the acoustic noise in the generated signal.

8. An apparatus as in claim 1 further comprising:
   a housing;
   an electronic display connected to the housing;
   electronic circuitry located at least partially in the housing, where the electronic circuitry comprises the at least one processor, the at least one non-transitory memory, a flash, a receiver and a transmitter; and
   a battery connected to the housing.

9. An apparatus comprising:
   a camera that is at least partially internal in the apparatus;
   an air microphone for generating a signal from sound received at the air microphone, the sound including acoustic noise generated by the camera;
   at least one processor; and
   at least one non-transitory memory including computer program code,
   the at least one memory and the computer program code configured to, with the at least one processor, cause the apparatus to:
   select a noise removal algorithm model stored in the at least one memory for removing a noise component from the generated signal that at least partially corresponds to the acoustic noise generated by the camera, where the model is selected based upon at least one drive signal which indicates use of one or more operations of the camera.

10. An apparatus as in claim 9, the apparatus is a hand-held portable apparatus.

11. A method comprising:
    using a contact microphone of an apparatus to sense object vibrations;
    generating a signal from at least one air microphone of the apparatus, where the signal is generated based upon sound received at the at least one air microphone, where the sound includes acoustic noise generated by a camera of the apparatus; and
    utilizing the sensed vibrations to determine a noise component of the signal that at least partially corresponds to the acoustic noise generated by the camera of the apparatus, and removing the noise component from the signal.

12. A method as in claim 11 where the acoustic noise arises from at least one operation of the camera.

13. A method as in claim 12 where the at least one operation the camera comprises at least one of Auto Focus (AF) and Optical Image Stabilization (OIS).

14. A method as in claim 12 where the noise component is removed by subtracting a signal of the accelerometer from the signal generated by the at least one air microphone.

15. A method as in claim 12 where the accelerometer is located on the apparatus relative to the camera such that the acoustic sound from the camera reaches the at least one air microphone at substantially a same time as the accelerometer senses mechanical vibration arising from movement of the camera.

16. A method as in claim 11 wherein the contact microphone comprises an accelerometer.

17. A method as in claim 11 further comprising using a drive signal, which drives the camera to generate the acoustic noise, to determine the noise component of the signal.

18. A method as in claim 11 where the at least one air microphone comprises two or more air microphones, where the method comprises summing signals from the air microphones together with delays that maximize the acoustic noise in the generated signal.

19. A non-transitory program storage device readable by a machine, tangibly embodying a program of instructions executable by the machine for performing operations, the operations comprising:
  selecting a noise removal algorithm model, for removing a noise component from a signal output from an air microphone, said signal comprising acoustic noise generated by a camera and the noise component at least partially corresponding to the acoustic noise, where the selecting is based upon at least one drive signal which indicates use of one or more operations of the camera.

20. A non-transitory program storage device readable by a machine, tangibly embodying a program of instructions executable by the machine for performing operations, the operations comprising:
  from inputs of object vibrations sensed at a contact microphone and a signal output from an air microphone, said signal output comprising acoustic noise generated by a camera of an apparatus, utilizing the sensed object vibrations to determine a noise component of the signal that at least partially corresponds to the acoustic noise generated by the camera of the apparatus, and
  removing the determined noise component from the signal.

* * * * *